(12) United States Patent
Braun et al.

(10) Patent No.: US 10,054,010 B2
(45) Date of Patent: Aug. 21, 2018

(54) DRAINAGE SYSTEM FOR GAS TURBINE

(71) Applicant: Siemens Aktiengesellschaft, München (DE)

(72) Inventors: Gilbert Braun, Herzogenrath (DE); Shi Yun Tang, Shanghai (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 416 days.

(21) Appl. No.: 14/762,949

(22) PCT Filed: Feb. 12, 2014

(86) PCT No.: PCT/EP2014/052714
§ 371 (c)(1),
(2) Date: Jul. 23, 2015

(87) PCT Pub. No.: WO2014/128041
PCT Pub. Date: Aug. 28, 2014

(65) Prior Publication Data
US 2016/0003107 A1    Jan. 7, 2016

(30) Foreign Application Priority Data

Feb. 22, 2013  (CN) ........................... 2013 1 0057438

(51) Int. Cl.
*F01D 25/32* (2006.01)
*F16T 1/12* (2006.01)
*F02C 7/232* (2006.01)

(52) U.S. Cl.
CPC .............. *F01D 25/32* (2013.01); *F02C 7/232* (2013.01); *F16T 1/12* (2013.01)

(58) Field of Classification Search
CPC ............. F01D 25/32; F02C 7/232; F16T 1/12
See application file for complete search history.

(56) References Cited

U.S. PATENT DOCUMENTS 2,814,931 A * 12/1957 Johnson .................. F02C 7/232
60/39.094
4,452,037 A *  6/1984 Waddington ............ F01D 25/18
184/6.11
(Continued)

FOREIGN PATENT DOCUMENTS

CN         1156786 A      8/1997
CN         1202966 A     12/1998
(Continued)

OTHER PUBLICATIONS

International Search Report PCT/ISA/210 for International Application No. PCT/EP2014/052714 dated Sep. 9, 2014.
(Continued)

*Primary Examiner* — Nicolas A Arnett
(74) *Attorney, Agent, or Firm* — Harness, Dickey & Pierce, P.L.C.

(57) ABSTRACT

A drainage system includes at least one inflow pipe, a first outflow pipe, and a pressure vessel connected to the inflow pipe and the first outflow pipe separately. A throttle orifice plate and at least one switching valve are connected in series on each inflow pipe, and a throttle orifice plate and at least one switching valve are connected in series on the outflow pipe. The drainage system further includes a pressure release device, a check valve is also connected in series on each said inflow pipe, and a pressure measurement device is also connected to the pressure vessel. The pressure release device is an automatic pressure control valve connected to the pressure vessel. The drainage system for a gas turbine can remove condensate during operation of the gas turbine, thereby ensuring safe operation.

20 Claims, 1 Drawing Sheet

(56) References Cited

U.S. PATENT DOCUMENTS

| | | | |
|---|---|---|---|
| 5,259,424 A | 11/1993 | Miller et al. | |
| 5,597,020 A | 1/1997 | Miller et al. | |
| 5,653,269 A | 8/1997 | Miller et al. | |
| 5,654,502 A | 8/1997 | Dutton | |
| 5,899,073 A | 5/1999 | Akimaru | |
| 6,439,278 B1 | 8/2002 | Krasnov | |
| 6,467,497 B1* | 10/2002 | Stradinger | E03F 1/006 137/205 |
| 7,827,776 B2* | 11/2010 | Moore | C10J 3/00 60/39.094 |
| 8,388,918 B2* | 3/2013 | Zauderer | B01D 53/62 423/215.5 |
| 8,652,233 B2* | 2/2014 | Kramer | B01D 19/0005 95/14 |
| 2002/0129867 A1 | 9/2002 | Krasnov | |
| 2008/0115483 A1* | 5/2008 | Moore | C10J 3/00 60/39.461 |
| 2009/0077943 A1* | 3/2009 | Nakano | F01D 15/10 60/39.08 |

FOREIGN PATENT DOCUMENTS

| | | |
|---|---|---|
| CN | 1486409 A | 3/2004 |
| CN | 201620836 U | 11/2010 |
| CN | 102162347 A | 8/2011 |
| CN | 201963276 U | 9/2011 |
| CN | 202081866 U | 12/2011 |
| CN | 202546774 U | 11/2012 |
| CN | 104006285 A | 8/2014 |
| GB | 1308602 | 2/1973 |
| JP | H0886226 A | 4/1996 |
| JP | H08189796 A | 7/1996 |
| JP | H0979044 A | 3/1997 |
| JP | H09236025 A | 9/1997 |
| JP | 2000274206 A | 10/2000 |
| JP | 2004300991 A | 10/2004 |
| JP | 2005042957 A | 2/2005 |
| JP | 2006112092 A | 4/2006 |
| JP | 2006242225 A | 9/2006 |
| WO | WO-8501058 A1 | 3/1985 |
| WO | WO-9736130 A1 | 10/1997 |

OTHER PUBLICATIONS

Written Opinion of the International Searching Authority PCT/ISA/237 for International Application No. PCT/EP2014/052714 dated Sep. 9, 2014.

Chinese Office Action dated Nov. 7, 2016.

* cited by examiner

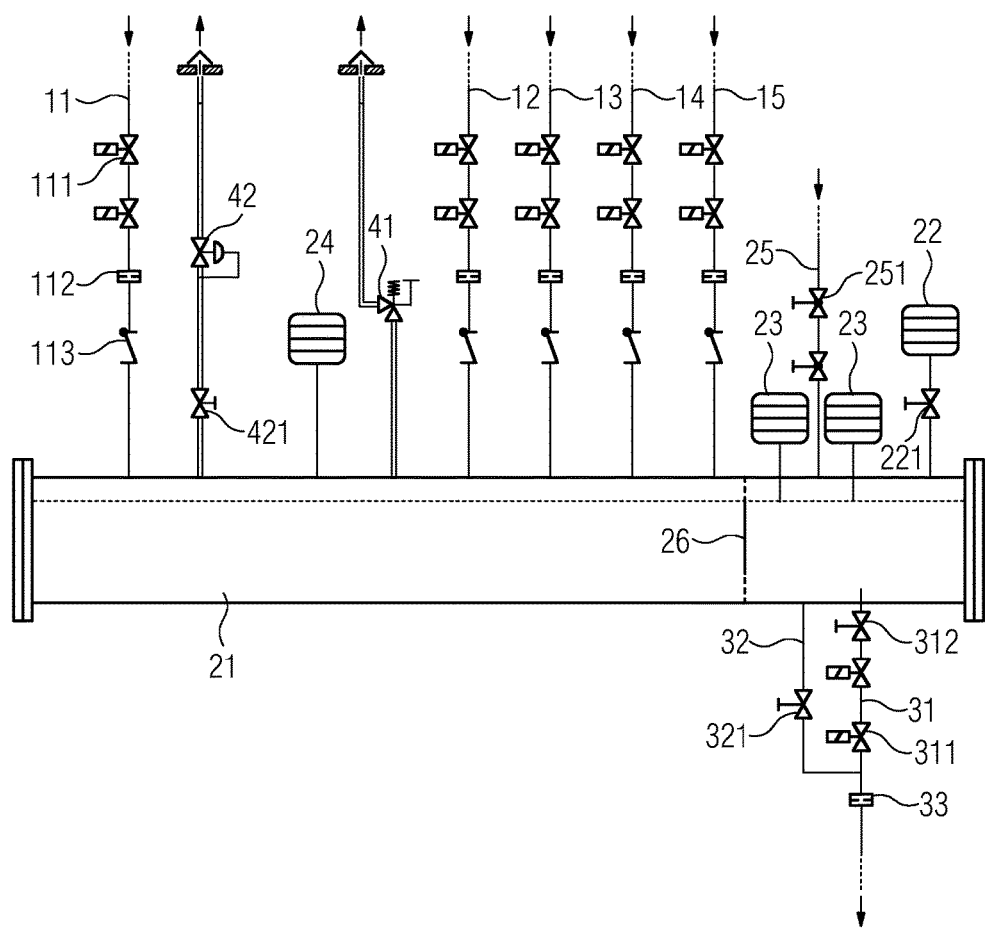

DRAINAGE SYSTEM FOR GAS TURBINE

PRIORITY STATEMENT

This application is the national phase under 35 U.S.C. § 371 of PCT International Application No. PCT/EP2014/052714 which has an International filing date of Feb. 12, 2014, which designated the United States of America and which claims priority to Chinese patent application number CN 20130057438.9 filed Feb. 22, 2013, the entire contents of each of which are hereby incorporated herein by reference.

FIELD

At least one embodiment of the present invention generally relates to a drainage system for a gas turbine, in particular to a drainage system for a gas turbine using natural gas as fuel.

BACKGROUND

In a gas turbine using natural gas as fuel, multiple connecting pipes connect a natural gas supply device to a combustion chamber of the gas turbine, wherein natural gas burns after being mixed with oxygen-containing gas from a compressor, thereby driving the operation of the gas turbine. The composition of natural gas may vary with its source and place of production, but the main constituent thereof is alkanes, especially methane. If the natural gas used contains a high level of constituents other than methane, condensates will form in the gas supply device and connecting pipes after a certain period of operation. These condensates consist mainly of propane, butane, pentane, ethylene, propylene and acetylene, etc., and are waxy, flammable and corrosive. If measures are not taken, the condensates which steadily build up may even enter the combustion chamber, affecting the combustion chamber nozzles as well as the stability of combustion.

Existing gas turbines are equipped with drainage systems for collecting condensed water from the natural gas supply device and connecting pipes when the turbines are shut down. Such drainage systems can only operate when the natural gas supply device has ceased operation (i.e. there is no natural gas in the connecting pipes), and so are only suitable for natural gas containing a low level of components other than methane. Since the flowability of the condensates is poor, such drainage systems are also unable to be used for the collection of condensates produced by natural gas containing a high level of components other than methane. Thus the question of how to increase the adaptability of a gas turbine to natural gas with different constituents, so that the gas turbine is suitable for natural gas containing a high level of constituents other than methane, is a question which urgently awaits solution in the art.

SUMMARY

At least one embodiment of the present invention provides a drainage system for a gas turbine, to remove condensate during operation of the gas turbine. The drainage system comprises at least one inflow pipe, a first outflow pipe, and a pressure vessel connected to the inflow pipe and the first outflow pipe separately. A throttle orifice plate and at least one switching valve are connected in series on each at least one inflow pipe, and a throttle orifice plate and at least one switching valve are connected in series on the first outflow pipe.

The drainage system further comprises a pressure release device, a check valve is also connected in series on each inflow pipe, and a pressure measurement device is also connected to the pressure vessel, wherein the pressure release device is an automatic pressure control valve connected to the pressure vessel. The drainage system of the present invention enables condensate to flow into the pressure vessel under the action of gas pressure and gravity while a natural gas supply device is operating, while the check valve can prevent natural gas that has already flowed into the pressure vessel from flowing back into the natural gas supply device or connecting pipes. In addition, the pressure measurement device can measure the pressure inside the pressure vessel, while the pressure release device can release the pressure inside the pressure vessel to ensure safety when the pressure measured by the pressure measurement device exceeds a certain value.

According to another aspect of at least one embodiment of the present invention, the drainage system further comprises another pressure release device, which is a safety valve with a manual function connected to the pressure vessel. The automatic pressure control valve facilitates operation of the pressure release device by an operator. Using the safety valve with a manual function in cooperation with the automatic pressure control valve allows the safety valve with a manual function to supplement the automatic pressure control valve, to release the pressure inside the pressure vessel when the automatic pressure control valve fails.

According to another aspect of at least one embodiment of the present invention, a liquid level measurement device is also connected to the pressure vessel. The liquid level measurement device enables the outflow pipe to be opened in the event of the liquid level exceeding a certain value to release space inside the pressure vessel in order to collect more condensate.

According to another aspect of at least one embodiment of the present invention, the pressure vessel further comprises a baffle. The baffle is perpendicular to a base plate of the pressure vessel, and has an opening which allows condensate to pass through the baffle. The baffle helps to keep the liquid level in the pressure vessel stable, to prevent the liquid level measured by the liquid level measurement device from being affected by fluctuation caused by condensate flowing into the pressure vessel.

According to another aspect of at least one embodiment of the present invention, the drainage system further comprises a second outflow pipe, with a throttle orifice plate and at least one switching valve being connected in series on the second outflow pipe; an inlet of the first outflow pipe is higher than the base plate of the pressure vessel, while an inlet of the second outflow pipe is at the same height as the base plate of the pressure vessel, and the first outflow pipe and the second outflow pipe share a throttle orifice plate. The first outflow pipe with its inlet higher than the base plate of the pressure vessel can prevent the liquid level in the pressure vessel from being too low, while the second outflow pipe at the same height as the base plate of the pressure vessel can drain the pressure vessel dry when necessary.

According to another aspect of at least one embodiment of the present invention, a water injection pipe is also connected to the pressure vessel. The water injection pipe is used for injecting water when the pressure vessel is being cleaned.

According to another aspect of at least one embodiment of the present invention, a switching valve is connected between the safety valve with a manual function and the pressure vessel, between the pressure measurement device and the pressure vessel, and on the water injection pipe, respectively. The switching valves are used for controlling fluid flowing to the relevant equipment.

According to another aspect of at least one embodiment of the present invention, a temperature measurement device is also connected to the pressure vessel. The temperature measurement device is used for giving an alarm when the temperature is higher or lower than a certain value, in order to control the corresponding valve.

According to another aspect of at least one embodiment of the present invention, two switching valves are connected in series on each inflow pipe, the switching valves being electrical switching valves. Electrical switching valves facilitate operation of the switching valves by the operator; the use of two switching valves helps to increase the reliability of fluid control.

According to another aspect of at least one embodiment of the present invention, the drainage system comprises five said inflow pipes. Multiple inflow pipes facilitate more complete collection of condensate from different positions in the natural gas supply device or connecting pipes.

Preferred embodiments are explained below with reference to the accompanying drawings in a clear and easy to understand way, to further illustrate the above characteristics, technical features and advantages of the present invention, and embodiments thereof.

BRIEF DESCRIPTION OF THE DRAWING

The accompanying drawing below merely illustrates and explains the present invention schematically, without defining the scope thereof.

FIG. 1 shows a schematic diagram of the drainage system according to an embodiment of the present invention, wherein the arrows indicate the direction of flow of fluid in a working state.

KEY TO THE LABELS 11, 12, 13, 14, 15 inflow pipes
111, 311 electrical switching valves
221, 251, 312, 321, 421 manual switching valves
112, 33 throttle orifice plate
21 pressure vessel
22 pressure measurement device
23 liquid level measurement device
24 temperature measurement device
25 water injection pipe
31 first outflow pipe
32 second outflow pipe
41 safety valve with manual function
42 automatic pressure control valve

DETAILED DESCRIPTION OF EXAMPLE EMBODIMENTS

In order that the technical features, object and effects of the present invention may be understood more clearly, particular embodiments thereof are explained with reference to the accompanying drawing. In the FIGURE, identical labels indicate either identical components or components with similar structures but identical functions, and where there are components with the same structure or function, only one of these is either drawn schematically or labelled. To give the drawings an uncluttered appearance, only those parts relevant to the present invention are represented schematically; these do not represent the actual structure of the present invention as a product. In this text, "connection" indicates a direct "connection" or a "connection" via a third component.

FIG. 1 shows a schematic diagram of the drainage system according to an embodiment of the present invention, wherein the drainage system for a gas turbine comprises five inflow pipes 11, 12, 13, 14 and 15, one first outflow pipe 31, and one pressure vessel 21 connected to the inflow pipes 11, 12, 13, 14 and 15 and to the first outflow pipe 31 separately. A throttle orifice plate and a switching valve are connected in series on each inflow pipe, wherein for the sake of simplicity and convenience, only the throttle orifice plate 112 and switching valve 111 on inflow pipe 11 are labeled, while the labels for the throttle orifice plates 112 and switching valves 111 on the other inflow pipes are omitted, as are those of the check valves 113 mentioned below.

At the same time, a throttle orifice plate 33 and at least one switching valve 311 are connected in series on the first outflow pipe 31. The drainage system further comprises a pressure release device, a check valve 113 is connected in series on each inflow pipe, and a pressure measurement device 22 is also connected to the pressure vessel 21, wherein the pressure release device is an automatic pressure control valve 42 connected to the pressure vessel 21. Those skilled in the art will understand that at least one inflow pipe, or a greater number of inflow pipes, may be provided according to specific requirements.

The drainage system of the present invention enables condensate to flow into the pressure vessel 21 under the action of gas pressure and gravity while the natural gas supply device is operating. The check valves 113 can prevent natural gas that has already flowed into the pressure vessel 21 from flowing back into the natural gas supply device or connecting pipes, wherein the inflow pipes are preferably connected at one or more relatively low points of the natural gas supply device or connecting pipes according to requirements and actual circumstances.

In addition, the pressure measurement device 22 can measure the pressure inside the pressure vessel 21, while the pressure release device can release the pressure inside the pressure vessel to ensure safety when the pressure measured by the pressure measurement device 22 exceeds a permitted value. If the pressure inside the pressure vessel 21 is lower than a certain value, the pressure is increased by introducing more natural gas into the pressure vessel 21. For example, the pressure inside the pressure vessel 21 can be kept at around 5 bar, to maintain the flowability of condensate in the pressure vessel 21, while avoiding vaporization of the condensate. This pressure also facilitates subsequent release of the space inside the pressure vessel 21 by opening the first outflow pipe 31, to collect more condensate.

Although there are two switching valves connected in series on each inflow pipe in FIG. 1, those skilled in the art will understand that it is also possible for just one switching valve to be connected in series on each inflow pipe, wherein the switching valve on the inflow pipe is preferably an electrical switching valve. The throttle orifice plate on each inflow pipe helps to reduce the loss of natural gas arising in the process of releasing the pressure or space in the pressure vessel 21.

The drainage system further comprises another pressure release device. This other pressure release device is a safety valve 41 with a manual function connected to the pressure vessel 21. The automatic pressure control valve 42 facilitates operation of the pressure release device by the operator. Using the safety valve 41 with a manual function in cooperation with the automatic pressure control valve 42 allows the safety valve 41 with a manual function to supplement the automatic pressure control valve 42, to release the pressure inside the pressure vessel 21 when the automatic pressure control valve 42 fails.

A liquid level measurement device 23 is also connected to the pressure vessel 21. The liquid level measurement device 23 enables the outflow pipe to be opened in the event of the liquid level exceeding a certain value to release space inside the pressure vessel 21 in order to collect more condensate. The pressure vessel 21 further comprises a baffle 26. The baffle 26 is perpendicular to a base plate of the pressure vessel 21, and has an opening which allows condensate to pass through the baffle 26. The baffle 26 helps to keep the liquid level in the pressure vessel 21 stable, to prevent the liquid level measured by the liquid level measurement device 23 from being affected by fluctuation caused by condensate flowing into the pressure vessel 21. Those skilled in the art will understand that "perpendicular" as used here does not mean absolutely perpendicular, but an approximate arrangement of the baffle 26 and the base plate of the pressure vessel 21, and can achieve the effect of stabilizing the liquid level measured by the liquid level measurement device 23.

The drainage system further comprises a second outflow pipe 32. A throttle orifice plate 33 and at least one switching valve 321 are connected in series on the second outflow pipe 32. An inlet of the first outflow pipe 31 is higher than the base plate of the pressure vessel 21, while an inlet of the second outflow pipe 32 is at the same height as the base plate of the pressure vessel 21. Those skilled in the art will understand that although one throttle orifice plate 33 is shared by the first outflow pipe 31 and the second outflow pipe 32 in the embodiment shown in FIG. 1, it is also possible to provide independent throttle orifice plates for the first outflow pipe 31 and the second outflow pipe 32. The first outflow pipe 31 with its inlet higher than the base plate of the pressure vessel 21 can prevent the liquid level in the pressure vessel 21 from being too low, while the second outflow pipe 32 at the same height as the base plate of the pressure vessel 21 can drain the pressure vessel 21 dry when necessary, for example when the pressure vessel 21 is being cleaned. A water injection pipe 25 is also connected to the pressure vessel 21, to allow water to be injected when the pressure vessel is being cleaned.

A switching valve (421, 221, 251) is connected between the safety valve 41 with a manual function and the pressure vessel 21, between the pressure measurement device 22 and the pressure vessel 21, and on the water injection pipe 25, respectively. The switching valves are used for controlling the fluid flowing to the relevant equipment, and are preferably manual switching valves.

A temperature measurement device 24 is also connected to the pressure vessel 21. The temperature measurement device is used for giving an alarm when the temperature is higher or lower than a certain value, in order to control the corresponding valve.

In this text, "schematic" indicates "serving as a real example, example or illustration"; no FIGURE or embodiment described as "schematic" herein should be interpreted as a more preferred or more advantageous technical solution.

The series of detailed explanations set forth above are merely specific explanations of embodiments of the present invention, and are by no means intended to limit the scope of protection thereof. All equivalent embodiments or changes made without departing from the artistic spirit of the present invention should be included within the scope of protection of the present invention.

The invention claimed is:

1. A drainage system for a gas turbine, comprising:
   at least one inflow pipe;
   a first outflow pipe;
   a pressure vessel, separately connected to the inflow pipe and the first outflow pipe, a throttle orifice plate and at least one switching valve being connected in series on each said at least one inflow pipe, and a throttle orifice plate and at least one switching valve being connected in series on the first outflow pipe; and
   a pressure release device, a check valve being also connected in series on each said at least one inflow pipe and a pressure measurement device being connected to the pressure vessel, wherein the pressure release device is an automatic pressure control valve connected to the pressure vessel.

2. The drainage system of claim 1, further comprising another pressure release device, the another pressure release device being a safety valve with a manual function connected to the pressure vessel.

3. The drainage system of claim 2, wherein a water injection pipe is also connected to the pressure vessel and wherein a switching valve is connected between the safety valve with a manual function and the pressure vessel, between the pressure measurement device and the pressure vessel, and on the water injection pipe, respectively.

4. A gas turbine comprising the drainage system of claim 3.

5. The drainage system of claim 2, wherein a liquid level measurement device is also connected to the pressure vessel.

6. The drainage system of claim 5, wherein the pressure vessel further comprises a baffle, the baffle being perpendicular to a base plate of pressure vessel, and including an opening which allows condensate to pass through the baffle.

7. The drainage system of claim 2, further comprising:
   a second outflow pipe, a throttle orifice plate and at least one switching valve being connected in series on the second outflow pipe; an inlet of the first outflow pipe being relatively higher than a base plate of the pressure vessel, and an inlet of the second outflow pipe being at the same height as the base plate of the pressure vessel, and the first outflow pipe and the second outflow pipe share a throttle orifice plate.

8. The drainage system of claim 7, wherein a water injection pipe is also connected to the pressure vessel.

9. The drainage system of claim 7, wherein a switching valve is connected between the safety valve with a manual function and the pressure vessel, between the pressure measurement device and the pressure vessel, and on the water injection pipe, respectively.

10. A gas turbine comprising the drainage system of claim 9.

11. A gas turbine comprising the drainage system of claim 7.

12. The drainage system of claim 1, wherein a liquid level measurement device is also connected to the pressure vessel.

13. The drainage system of claim 12, wherein the pressure vessel further comprises a baffle, the baffle being perpendicular to a base plate of the pressure vessel, and including an opening which allows condensate to pass through the baffle.

14. The drainage system of claim 12, wherein a temperature measurement device is also connected to the pressure vessel.

15. The drainage system of claim 14, wherein two switching valves are connected in series on each said at least one inflow pipe, the switching valves being electrical switching valves.

16. The drainage system of claim 15, wherein said at least one inflow pipe includes five inflow pipes.

17. The drainage system of claim 1, further comprising:
a second outflow pipe, a throttle orifice plate and at least one switching valve being connected in series on the second outflow pipe; an inlet of the first outflow pipe being relatively higher than a base plate of the pressure vessel, and an inlet of the second outflow pipe being at the same height as the base plate of the pressure vessel, and the first outflow pipe and the second outflow pipe share a throttle orifice plate.

18. A gas turbine comprising the drainage system of claim 17.

19. The drainage system of claim 1, wherein a water injection pipe is also connected to the pressure vessel.

20. A gas turbine comprising the drainage system of claim 1.

\* \* \* \* \*